US012699917B2

(12) United States Patent
Bhattacharjya et al.

(10) Patent No.: US 12,699,917 B2
(45) Date of Patent: Aug. 4, 2026

(54) CAPTURING ORDINAL HISTORICAL DEPENDENCE IN GRAPHICAL EVENT MODELS WITH TREE REPRESENTATIONS

(71) Applicant: International Business Machines Corporation, Armonk, NY (US)

(72) Inventors: Debarun Bhattacharjya, New York, NY (US); Tian Gao, Berkeley Heights, NJ (US); Dharmashankar Subramanian, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1269 days.

(21) Appl. No.: 17/503,557

(22) Filed: Oct. 18, 2021

(65) Prior Publication Data

US 2023/0123421 A1 Apr. 20, 2023

(51) Int. Cl.
*G06N 20/00* (2019.01)
*G06F 18/214* (2023.01)
*G06N 7/01* (2023.01)

(52) U.S. Cl.
CPC ......... *G06N 20/00* (2019.01); *G06F 18/2155* (2023.01); *G06N 7/01* (2023.01)

(58) Field of Classification Search
CPC .......... G06N 20/00; G06N 7/01; G06N 5/022; G06N 5/01; G06F 18/2155; G06F 18/24323
See application file for complete search history.

(56) References Cited

U.S. PATENT DOCUMENTS

| 7,660,705 | B1 | 2/2010 | Meek |
| 8,065,257 | B2 | 11/2011 | Kuecuekyan |
| 10,116,670 | B2 | 10/2018 | Muddu |

(Continued)

FOREIGN PATENT DOCUMENTS

CN 112507124 A 3/2021

OTHER PUBLICATIONS

Bhattacharjya, D., et al., "Order-Dependent Event Models for Agent Interactions", Proceedings of the Twenty-Ninth International Joint Conference on Artificial Intelligence Main track. pp. 1977-1983 (Jan. 2021).

(Continued)

*Primary Examiner* — Jennifer N Welch
*Assistant Examiner* — Amy P Hoang
(74) *Attorney, Agent, or Firm* — Seed Intellectual Property Law Group LLP

(57) ABSTRACT

A computer system, computer program product, and computer-implemented method are provided that includes learning a tree ordered graphical event model from an event dataset. Temporal relationships between one or more events in received temporal event data is modeled, and an ordered graphical event model (OGEM) graph is learned. The learned OGEM graph is configured to capture ordinal historical dependence. Leveraging the learned OGEM graph, a parameter sharing architecture is learned, including order dependent statistical and causal co-occurrence relationships among event types. A control signal to an operatively coupled event device that is associated with at least one event type reflected in the learned parameter sharing environment is dynamically issued. The control signal is configured to selectively control an event injection.

12 Claims, 8 Drawing Sheets

(56) References Cited

U.S. PATENT DOCUMENTS

| | | | | |
|---|---|---|---|---|
| 2009/0287630 A1* | 11/2009 | Kaiser | | G06N 5/02 |
| | | | | 706/50 |
| 2015/0120627 A1* | 4/2015 | Hunzinger | | G06N 3/08 |
| | | | | 706/20 |
| 2015/0309854 A1* | 10/2015 | Fradkin | | G06F 11/079 |
| | | | | 714/47.3 |
| 2017/0142140 A1* | 5/2017 | Muddu | | G06F 3/0482 |
| 2019/0379700 A1 | 12/2019 | Canzanese, Jr. | | |
| 2020/0169469 A1* | 5/2020 | Bhattacharjya | | H04L 67/10 |
| 2020/0394576 A1 | 12/2020 | Fan | | |
| 2021/0256406 A1* | 8/2021 | Lau | | G06N 7/01 |
| 2023/0096290 A1* | 3/2023 | Garapati | | H04L 41/145 |
| | | | | 714/4.1 |

OTHER PUBLICATIONS

Bhattacharjya, D., et al., "Ordinal Historical Dependence in Graphical Event Models with Tree Representations", Proceedings of the AAAI Conference on Artificial Intelligence, 35(8), 6759-6767 (2021).
Bhattacharjya, D., et al., "Proximal Graphical Event Models", 32nd Conference on Neural Information Processing Systems (NeurIPS 2018).
Didelez, Vanessa, "Graphical models for marked point processes based on local independence", Journal of the Royal Statistical Society, Ser. B., 70(1), pp. 245-264 (2008).
Eichler, Michael, "Graphical Models in Time Series Analysis", PhD Thesis, University of Heidelberg, Germany, 1999.
Gunawardana, A., et al., "Universal Models of Multivariate Temporal Point Processes", Proceedings of the International Conference on Artificial Intelligence and Statistics (AISTATS), pp. 556-563 (2016).
Meek, Christopher, "Toward Learning Graphical and Causal Process Models", Proceedings of the Uncertainty in Artificial Intelligence Workshop on Causal Inference: Learning and Prediction, pp. 43-48, (2014).
Dahlhaus Rainer. "Graphical Interaction Models for Multivariate Time Series", Metrics, 2000, pp. 157-172.
Dean et al. "A Model for Reasoning About Persistence and Causation", Computational Intelligence, Dec. 1, 1989, pp. 142-150, vol. 5, Issue 3, https://doi.org/10.1111/j.1467-8640.1989.tb00324.
Murphy Kevin Patrick. "Dynamic Bayesian Networks: Representation, Inference and Learning", Doctor of Philosophy in Computer Science, University of California, Berkeley Professor Stuart Russell, Chair, 2002, 225 pages.
Nodelman et al. "Continuous Time Bayesian Networks", Conference: Proceedings of the Eighteenth International Conference on Uncertainty in Artificial Intelligence, Jan. 2002, 11 pages.

* cited by examiner

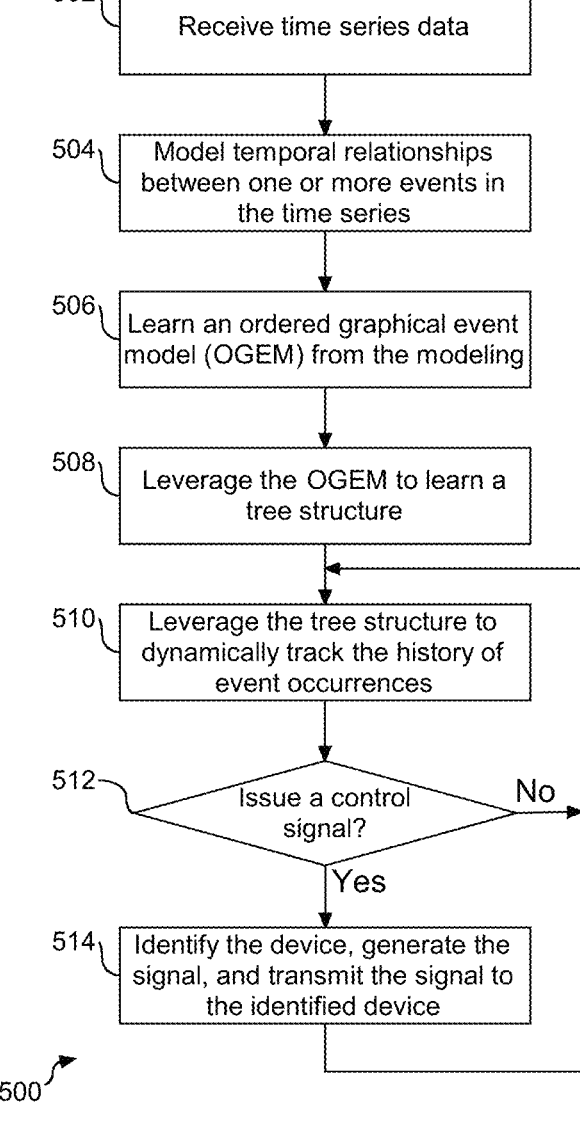

502 — Receive time series data

504 — Model temporal relationships between one or more events in the time series 506 — Learn an ordered graphical event model (OGEM) from the modeling 508 — Leverage the OGEM to learn a tree structure 510 — Leverage the tree structure to dynamically track the history of event occurrences 512 — Issue a control signal?  No / Yes 514 — Identify the device, generate the signal, and transmit the signal to the identified device

CAPTURING ORDINAL HISTORICAL DEPENDENCE IN GRAPHICAL EVENT MODELS WITH TREE REPRESENTATIONS

GOVERNMENT LICENSE RIGHTS

This invention was made with government support under agreement number FA8750-19-C-0206 awarded by the Air Force Research Laboratory. The government has certain rights to this invention.

BACKGROUND

The present embodiments relate to a system, a computer program product, and a computer-implemented method for learning a tree based ordinal graphical event model as an order representation of temporal event data for capturing ordinal historical dependence.

Event datasets are sequences of events of various types occurring regularly or irregularly over a time-line. Modeling temporal relationships between various types of events in time-stamped streams of event occurrences is useful in a wide variety of applications, including, but not limited to, system reliability, social networks, manufacturing processes, retail, healthcare, politics, and finance, to explore dynamics and behavior of such applications and corresponding systems.

Multivariate event streams in continuous time can be modeled as samples from a marked or multivariable point process, which is a stochastic process that involves counting processes for event labels. Each label is associated with a conditional intensity function that determines its rate of occurrence at any time given historical occurrences of its causal event labels. Temporal models often fit within a high-level framework of graphical event models (GEMs), which are graphical representations of marked point processes that explicitly indicate which labels' historical occurrences have a direct influence on process dynamics of any particular event label. GEMs capture the dependence structure of events that occur in time. These models are interpretable and provide insights about event dynamics. Given a dataset, a GEM is a directed graph with nodes representing labels and edges representing relationships between labels. Challenges associated with GEMs include managing an exponential quantity of potential orders of events as a function of the causes. The embodiments shown and described here are directed at a learning platform that compactly captures ordinal historical dependence.

SUMMARY

The embodiments include a system, a computer program product, and a method for learning a tree ordinal graphical event model from an event dataset. This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

In one aspect, a computer system is provided with a processor operatively coupled to memory. The memory contains instructions that, when executed by the processor, are configured to cause the processor to perform a method of learning a tree ordinal graphical event model from an event dataset. The method is configured to model temporal relationships between one or more events in received time series data, and to learn an ordered graphical event model (OGEM) graph, which includes capturing ordinal historical dependence. The method is further configured to automatically learn a parameter sharing architecture, which includes leveraging the OGEM graph and learning order dependent statistical and causal co-occurrence relationships among event types. The method is even further configured to dynamically issue a control signal to an operatively coupled event device that is associated with at least one event type reflected in the learned parameter sharing environment. The control signal is configured to selectively control an event injection.

In another aspect, a computer program product is provided. The computer program product includes a computer readable storage medium having program code embodied therewith. The program code is executable by a processor to model temporal relationships between one or more events in received time series data, with the program code further configured to learn an ordered graphical event model (OGEM) graph, with the OGEM configured to capture ordinal historical dependence. The program code is configured to automatically learn a parameter's sharing architecture, which includes the ML manager leveraging the OGEM graph and learning order dependent statistical and causal co-occurrence relationships among event types. Additional program code is provided and configured to dynamically issue a control signal to an operatively coupled event device that is associated with at least one event type reflected in the learned parameter sharing environment. The control signal is configured to selectively control an event injection.

In a further aspect, a computer-implemented method is provided. Temporal relationships between one or more events in received time series data is modeled, and an ordered graphical event model (OGEM) graph is learned. The learned OGEM graph is configured to capture ordinal historical dependence. A parameter sharing architecture is automatically learned, which includes leveraging the OGEM graph and learning order dependent statistical and causal co-occurrence relationships among event types. A control signal to an operatively coupled event device that is associated with at least one event type reflected in the learned parameter sharing environment is dynamically issued. The control signal is configured to selectively control an event injection.

These and other features and advantages will become apparent from the following detailed description of the exemplary embodiment(s), taken in conjunction with the accompanying drawings, which describe and illustrate various systems, sub-systems, devices, apparatus, models, processes, and methods of additional aspects.

BRIEF DESCRIPTION OF THE SEVERAL VIEWS OF THE DRAWINGS

The drawings referenced herein form a part of the specification, and are incorporated herein by reference. Features shown in the drawings are meant as illustrative of only some embodiments, and not of all embodiments, unless otherwise explicitly indicated.

FIG. 5 illustrates a flow chart for learning the OGEM tree and leveraging the learn OGEM tree to selectively control an event injection.

FIG. 8 illustrates a block diagram depicting a set of functional abstraction model layers provided by the cloud computing environment.

DETAILED DESCRIPTION

It will be readily understood that the components of the exemplary embodiments, as generally described and illustrated in the Figures herein, may be arranged and designed in a wide variety of different configurations. Thus, the following detailed description of the embodiments of the system, the computer program product, and the method and other aspect described herein, as presented in this description and the accompanying Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment. It should be understood that the various embodiments may be combined with one another and that embodiments may be used to modify one another.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A point process is a collection of random variables that are positions in space. A marked point process is a point process in which some additional features are measured at each point. An event stream consists of a sequence of timestamps with labels on a common timeline. A label, also known as an event label, corresponds to an event type occurring on the timeline. Any event stream in continuous time can be modeled as a marked point process. An event stream is a sequence of temporally ordered time-stamped events, $$D = \{(l_i, t_i)\} =_{i=1}^{N},$$

where event label $l_i$ occurs at time $t_i$. Event label $l_i$ belongs to label set L with cardinality M=|L|, and time $t_i \in \mathbb{R}^+$ lies between $t_0$ and final time $t_{N+1}$=T.

Figure 1A:
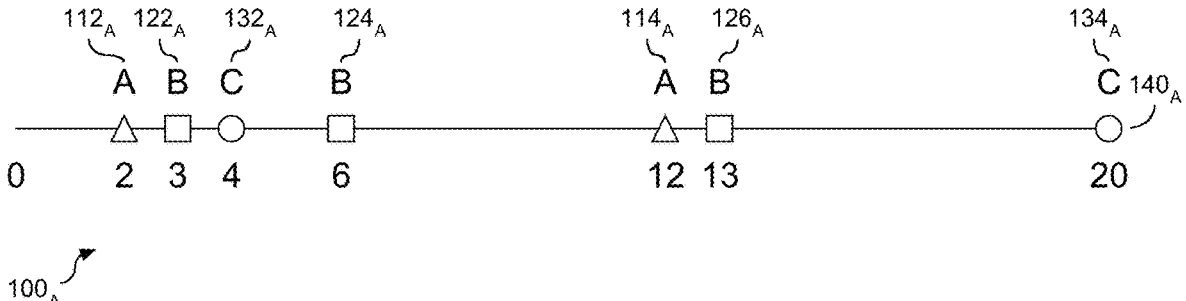
FIG. 1A illustrates a diagram of an example event stream.

Referring to FIG. 1A, a diagram ($100_A$) is provided to illustrate an example event stream. As shown, there are seven events, N=7, over a set, L, of 3 event labels, shown herein as labels A, B, and C, e.g. L={A,B,C}. As shown in this example event label A occurs at t=2, shown herein as ($112_A$) and t=12, shown herein as ($114_A$), event label B occurs at t=3, shown herein as ($122_A$), t=6, shown herein as ($124_A$), and t=13, shown herein as ($126_A$), and event label C occurs at t=4, shown herein as ($132_A$), and t=20, shown herein as ($134_A$), and the final time, $t_{N+1}$=20, shown herein as ($140_A$). The event stream shown herein is illustrative, and in an embodiment the event stream may be larger and more complex with additional labels. Dynamics of event occurrences are captured by conditional intensity functions, which measure the rate at which an event label occurs. In an embodiment, the conditional intensity for event label X at time t is a function of this history at that time, $h_t$, i.e. it is denoted as $\lambda_x(t|h_t)$ where $h_t=\{(l_i, t_i): t_i<t\}$ includes all preceding events at time t.

Any event stream in continuous time, such as that shown in FIG. 1A, can be modeled as a marked point process. Graphical event models (GEMs) are a family of models that provide a framework for representing a marked point process over event labels. The GEM includes a directed graph G with a node for every event label. Conditional intensity functions for each label at any time t depends only on historical occurrences of its parent labels in the directed graph G. As shown and described herein, an ordinal GEM (OGEM) is provided to capture ordinal historical dependence to represent different rates for different orders of a label's parent(s). Ordinal historical dependence with respect to event streams describes an event label's arrival rate as being determined by a recent historical order in which its underlying causal events have occurred. The OGEM is a structure that shows historical influence of occurrences of a parent and arrival rate of a child.

Figure 1B:
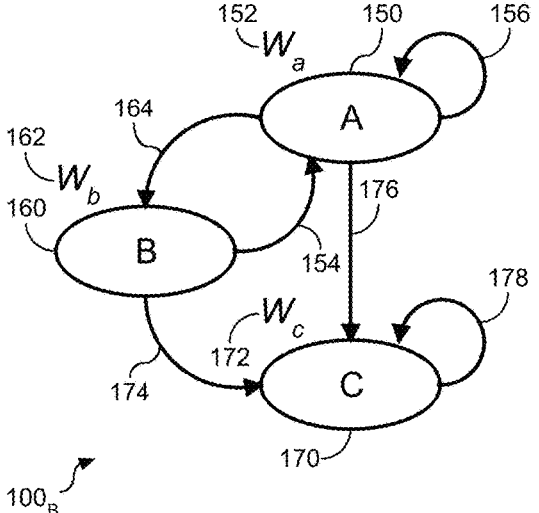
FIG. 1B illustrates a graphical representation of an OGEM as a corresponding representation of the event stream shown in FIG. 1A.

Referring to FIG. 1B, a graphical representation ($100_B$) of an OGEM is shown as a corresponding representation of the event stream shown in FIG. 1A. Each event label represented in the event stream of FIG. 1A is represented in the OGEM as a node in the graph, including event label A (150), event label B (160), and event label C (170). In an embodiment, the graph shown herein can be cyclic. Each label in the OGEM is represented as a node and has a corresponding time window, w. Furthermore, each node is an arrival process, and as such has a rate of arrival at every point in time. As shown, label A (150) is associated with corresponding time window $w_A$ (152), event label B (160) is associated with corresponding time window $w_B$ (162), and event label C (170) is associated with corresponding time window $w_C$ (172). Each of the nodes in the representation is shown with at least one parent, with the parent designation shown by the associated edge(s) and edge indicia. The parent(s) of a node, as shown herein via directed edges coming in from one or more parents, denote that historical occurrences of parent events influence or affect the current and future rate of arrival of the child node. For example, label A (150) is shown with two parents (154) and (156), label B (160) is shown with one parent (164), and label C (170) is shown with three parents (174), (176), and (178). The window for any of the labels, e.g. nodes, is dependent on the historical occurrences of the associated parent(s). For example, time window $w_A$ (152) is dependent on historical occurrences of event labels (150) and (160), time window $w_B$ (162) is dependent on historical occurrences of event label (150), and time window $w_C$ (172) is dependent on historical occurrences of event labels (150), (160), and (170). Accordingly, the OGEM shown herein represents the order in which historical parent events happen will determine the influence on the child node's arrival rate.

Figure 2:
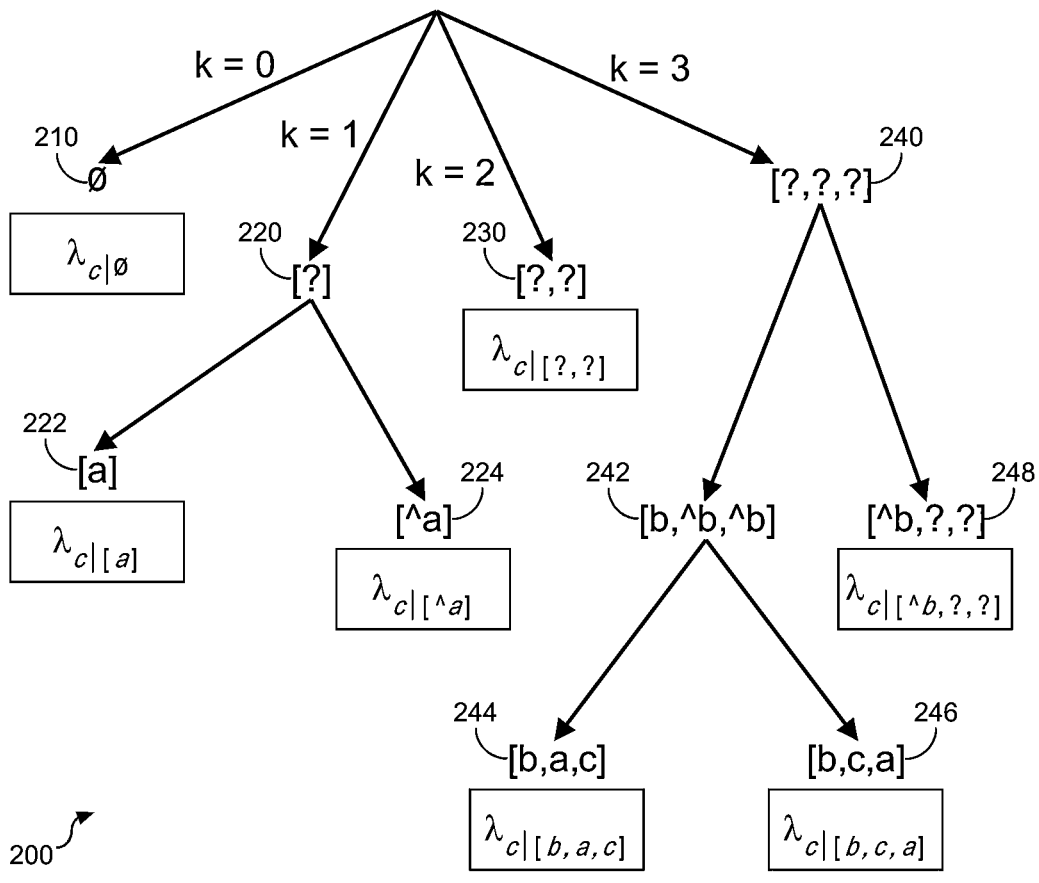
FIG. 2 illustrates an ordinal tree representation of a parametric representation for event label C in a time window $w_C$ from the OGEM graph shown in FIG. 1B.

As shown and described herein a tree-based representation for conditional intensity parameters that compactly captures ordinal historical dependency is provided. In an exemplary embodiment, the tree-based representation is referred to as an ordinal tree representation for conditional intensities. Referring to FIG. 2, a diagram (200) is shown as the ordinal tree representation illustrating a parametric representation for event label C in a time window $w_C$ from the OGEM shown in FIG. 1B. The representation is a tree, also referred to as a parameter tree. The variable k represents a preceding event label. The tree shown herein is split based on the number of preceding event labels, e.g. number of parents to event label C, in a recent time window, $w_C$. In an exemplary embodiment, the recent time window may be a week, a month, etc. Using the OGEM shown in FIG. 1B, the variable k may range from k=0, where nothing happens, to k=3, where all three parents labels occur in some order. Each node in the tree represents a grouping of orders of subsets of the labels, e.g. label A, label B, and label C, with a fixed length k, where individual leaves of the tree contain order representations, i.e. leaves are individually filled or available or restricted.

The rate of event label C depends on the order of events of its parents in the past, which in this example and as shown in FIG. 1B are event labels A, B, and C. Each leaf node is shown with an associated conditional intensity rate parameter, $\lambda$. In the example shown herein, if no event has historically occurred in the recent time window, $w_C$, e.g. k=0, then the corresponding conditional intensity rate parameter for label C is null, e.g. $k_{C|\varnothing}$, as shown at (210). As further shown herein by way of example, if a single event has historically occurred in the recent time window, $w_C$, e.g. k=1, then the corresponding conditional intensity rate parameter for label C for any event (220) is shown as having two leaf nodes (222) and (224). Leaf node (222) represents the rate of label C if event label A has occurred in the recent time window $w_C$, and is shown herein as $\lambda_{c|[a]}$, and leaf node (224) represents the rate of label C if event label A has not occurred but events labels B and/or C may have occurred in the recent time window $w_C$, and is shown herein as $\lambda_{c|[\wedge a]}$. Leaf node (230) represents the rate of label C if two events have historically occurred in the recent time window, $w_C$, e.g. k=2, and is shown herein as $\lambda_{c|[?,?]}$, where the symbol ? functions as an indicator of any order of the corresponding event labels. Leaf nodes (244), (246), and (248) represent the rate of label C if three events have historically occurred in the recent time window, $w_C$, e.g. k=3. As shown at (240), the event order is unknown. Branching from (240), it is shown at (242) that the order starts with label B, but the order of labels A and C is unknown. As further shown, leaf nodes (244) and (246) emanate from node (242). Leaf node (244) represents the rate of label C if events labels B, A, C has occurred in this order in the recent time window $w_C$, and is shown herein as $\lambda_{c|[b,a,c]}$, and leaf node (246) represents the rate of label C if event labels B,C,A has occurred in this order in the recent time window $w_C$, and is shown herein as $\lambda_{c|[b,c,a]}$. Leaf node (248) represents the rate of label C if the first event is not event label B and the order of the second two events is unknown, and is shown herein as $\lambda_{c|[\wedge b,?,?]}$. Accordingly, the tree shown herein is a compact or relatively compact parametrization of the OGEM shown in FIG. 1B, with the leaf nodes individually representing a rate at which event label C takes place with respect to different permutation of the order of event labels A, B, and C.

The system, computer program product, and computer implemented method of the embodiments are directed at learning the tree based ordinal graphical model, hereinafter referred to as a tree OGEM, for a multivariate event stream, an example model which is shown and described in FIG. 2. Any event stream in continuous time, under reasonable regular conditions, can be modeled as a marked point process. The dynamics of event occurrences are captured by conditional intensity functions, which measure the rate at which an event label occurs. The conditional intensity for event label X at time t can be written as a function of the history at that time, $h_t$, and is denoted $\lambda_x(t|h_t)$ where $h_t$ includes all preceding events at time t. It is understood in the art the each parent label may occur multiple times in history in a recurring event stream. In an exemplary embodiment, a masking function is applied to retain distinct label occurrences from history, thereby determining an active parent order at any point in time. The masking function, $\phi(\cdot)$, takes a sequence of events and returns a sub-sequence where no label is repeated. The masking function induces a unique event label order on the input sequence through a temporal ordering of distinct labels in the return sub-sequence. Accordingly, given an event dataset and a masking function, a corresponding OGEM tree and set of conditional intensity values are learned.

The following pseudocode, Algorithm 1, demonstrates learning the OGEM tree representation, and returns the tree and corresponding tree data:

```
1.   procedure OptTree (event label X, parents U, window wₓ, masking
     function ϕ(•), dataset D
2.       Initialize root of tree T
3.       for k from 0 to |U| do
4.           Learn optimal subtree T_k from procedure 'OptSubTree'
5.           Make its root a child of the tree root
6.       return Optimal tree T
```

Lines 1-6 of the pseudocode demonstrate learning an optimal tree and corresponding tree data. As shown in line 4, a subroutine referred to as OptSubTree is called to demonstrate learning an optimal subtree for each event label and learning tree parameter representations.

The following pseudocode demonstrates the called subroutine OptSubTree:

```
1.   procedure OptSubTree (event label X, parents U, window wₓ,
     masking function ϕ(•), dataset D, subtree length k)
2.       Initialize representation list R, tree T_k and model information for
         representations I as empty
3.       Set root of subtree as r = [?, ?, . . .] (k times)
4.       Add r to list R and tree T_k
5.       Compute all model information (summary stats, lambdas, LL and
         score) for the root; store in I
6.       while R not empty do
7.           Choose any representation r in R and determine all feasible
             splits by filling a single slot
8.           for both children r_C in each feasible split of r do
9.               if r_C ∈ I then
10.                  Retrieve model information from I
11.              else
12.                  Compute all model information; store in I
13.          Consider feasible split with maximum total score
14.          if feasible split and secure improvement from this split over
             parent > 0 then
15.              Make parent r an internal node of tree T_k
16.              Add both r_C from this split to list R
17.          else
18.              Remove parent r from list R; make it a leaf node
19.      return Optimal sub-tree T_k for this k; Model info. I
```

As shown in the subroutines OptTree and OptSubTree, a tree OGEM is learned from an event dataset D, including jointly learning tree parameter representation(s) G and Λ for the tree OGEM, where G is the OGEM and Λ is a set of all intensity rate parameters, λ. Referring to line 5 of the OptSubTree algorithm, a log likelihood computation is used to assess or quantify an event label in the tree OGEM. In an exemplary embodiment, computing the log likelihood and a score that adjusts for model complexity may take place at any stage of tree construction. For event label X in a tree OGEM with leaf order representations $r_L$ and corresponding intensities $\lambda_{x|r_L}$, its log likelihood for an event dataset D can be computed using summary statistics as follows:

$$\log L_X(D) = \Sigma_{r_L}(-\lambda_{x|r_L}D(r_L)+N(x;r_L)\ln(\lambda_{x|r_L}))$$

Equation 1 where $N(x; r_L)$ is the number of times X is observed in the dataset and the order instantiation is consistent with the order representation $r_L$ in the preceding window $w_X$, and $D(r_L)$ is the duration over the entire time period where order instantiations consistent with the condition $r_L$ hold.

Although not shown, counts and durations depend on the window $w_X$. In statistics, a Bayesian Information Criterion (BIC) is a criterion for model selection among a finite set of models. In an exemplary embodiment, the BIC score is leveraged for model selection. The BIC score may be assessed as follows:

$$S_X(U; \Lambda_X; D) = \log L_X(D)^* - \gamma\frac{|\Lambda_X|}{2}\log(T)$$

Equation 2 where $\log L_X(D)^*$ is the log likelihood for X from Equation 1 computed at the maximum likelihood estimates for rate $$\left(\hat{\lambda}_{x|r_L} = \frac{N(x;r_L)}{D(r_L)}\right), |\Lambda_X|$$

is the number of conditional intensities for X in the model, γ is a penalty weight on the complexity, which in an exemplary embodiment is set to 1, and T is the time horizon of the event dataset. As shown and described below in the pseudo code of Algorithm 2, the BIC score is leveraged to assess whether to add or remove a parental candidate for a target node by checking whether the BIC score improves with a modified parental set.

Algorithm 1 shown and described in the corresponding pseudocode outlines a greedy approach for growing subtrees and therefore determining parameters at the leaves. Each sub-tree starts with the root order representation that groups all order instantiations of the same length. In an exemplary embodiment, a list of nodes R in the tree is maintained, as is a data structure I for storing computed information, such as log likelihood and associated scores. For each node in R, all possible feasible splits are considered by filling in any one available slot in one child and restricting the corresponding split in another child, as this ensures mutually exclusive order representations. The split with the optimal score improvement is made, and the procedure continues with the tree growing until score improvement is negligible or non-existent. In an exemplary embodiment, data structure I stores information associated with visited nodes in the event prior information may need to be re-used at a later splitting decision. Computing the score for any order representation in the tree scans the dataset and computer ordinal summary statistics, such as the counts and durations in Equation 1. Accordingly, as shown herein the order in which the nodes in R are visited is not consequential.

The model information computation(s), as shown in the OptSubTree pseudocode is directed at learning tree paragraph representations, which in an embodiment leverages known parents and corresponding time windows. The following pseudocode, Algorithm 2, demonstrates a forward-backward search method to learn the parents of a node, X.

```
1.  procedure GraphSearch (event label X, window w_X, masking function
    φ(•), dataset D, type of model learner: tabular or tree)
2.     U ← Ø; V ← label set L in D
3.     S* ← − I n f
4.     for each label Z in V do          //Forward Search//
5.         Compute S_X(U ∪ Z)
6.         if S_X(U ∪ Z) > S* then
7.             S* ← S_X(U ∪ Z)
8.             U ← U ∪ Z
9.     for each label Z in U do          //Backward Search//
10.        Compute S_X(U \ Z)
11.        if S_X(U \ Z) > S* then
12.            S* ← S_X(U \ Z)
13.            U ← U \ Z
14.    Return U
```

The forward and backward search shown herein iteratively adds one candidate event label Z to U and tests the results of the score, where U is a set of parent labels. In an exemplary embodiment, the score assessment determines if $S_X(U∪Z)$ is better than a current score, S*, as shown in line 6 of the pseudocode. If the assessment at line 6 is true, the set of parent labels U is updated and the next event label Z is queried. The forward search adds as many nodes as beneficial for the score. When the forward search is complete, the backward search is initiated to iteratively test if removing an event label Z from U would improve the score. See line 11 of the pseudocode. In an exemplary embodiment, the backward search updates the set of parent labels if it is determined that the removal would improve the score. Accordingly, the pseudocode shown herein demonstrates a process of learning, and thereby identifying, the parent event label(s), U.

The score assessment shown in lines 5 and 11 of the forward-backward search method to learn the parents of a node, as shown in the pseudocode above, leverages a window learning procedure. The following pseudocode, Algorithm 3, demonstrates a method to learn time windows, $w_X$, for all nodes X, which in an exemplary embodiment is learned by maximizing the log likelihood over an event dataset.

```
1.  procedure LearnWindow (event label X, parents U, masking function
    φ(•), dataset D, type of model learner: tabular or tree)
2.     Compute inter-event times {t̂_zx} and {t̂_zz} by scanning through
       dataset D
3.     Computer candidate window pairs W^c= {w_ZX}, ∀Z, X ∈ L,
       assuming that Z is the only parent of X
4.     S* ← − I n f
5.     for each label Z in U do          //Loop over all parents//
6.         Compute all model information including S_X(U) and Λ_X, using
           procedure ComputerScore with window w_X = w_ZX from W^c
7.         if S_X(U) > S* then
8.             S* ← S_X(U)
9.             w_X* ← w_ZX
10.            Λ_X* ← Λ_X
11.    return w_X*, Λ_X*
```

As shown, inter-event times are computed, and then candidate windows $w^*_X$ and candidate conditional intensity parameters $\Lambda^*_X$ are obtained. In an exemplary embodiment, it is assumed that a parent Z is the only parent of X.

As shown in the pseudocode of Algorithm 3 demonstrating learning time windows, a ComputeScore procedure is called. The following pseudocode demonstrates the assessment procedure that is used in the window learning algorithm described above.

```
1.  procedure ComputeScore (event label X, parent set Pa(X), window
    w_X, masking function φ(•), dataset D, type of model learner: tabular
    or tree)
2.      if Learner type is 'tabular' then
3.          Compute ordinal summary statistics
4.          Compute max likelihood parameter estimates, log likelihood at
            these estimates and score
5.      else                            //Learner type is 'tree'//
6.          Run the procedure OpTree (see Algorithm 1)
7.          Compute total score by summing the score of leaf
            representations in I
8.      return /\_X and score S_X(Pa(X))
```

The tree representation of the OGEM may be incorporated as a component for knowledge discovery from event stream data. More specifically, the tree based OGEM captures ordinal historical depending in conditional intensity functions for multivariate point processes. Learning the tree representation employs machine learning techniques that use event stream data involving various kinds of events. The applicability to event stream data may be diverse with respect to dataset types, including but not limited to, systems reliability, social networks, manufacturing processes, retail, healthcare, politics, and finance. In an exemplary embodiment, and as described in detail below, the tree representation of the OGEM may be employed in conjunction with tracking event occurrences in real-time. A control action may be applied in the form of a predictive feedback signal to an operatively coupled apparatus for a corresponding predictive event type. In an exemplary embodiment, application of the feedback signal may control an event injection for maximizing a likelihood of realizing an event. In an embodiment, the event control may be for an event that cannot be directly controlled. Accordingly, the learned model and parameters are used to compute a control action for feedback into one or more apparatus or associated systems.

Figure 3:
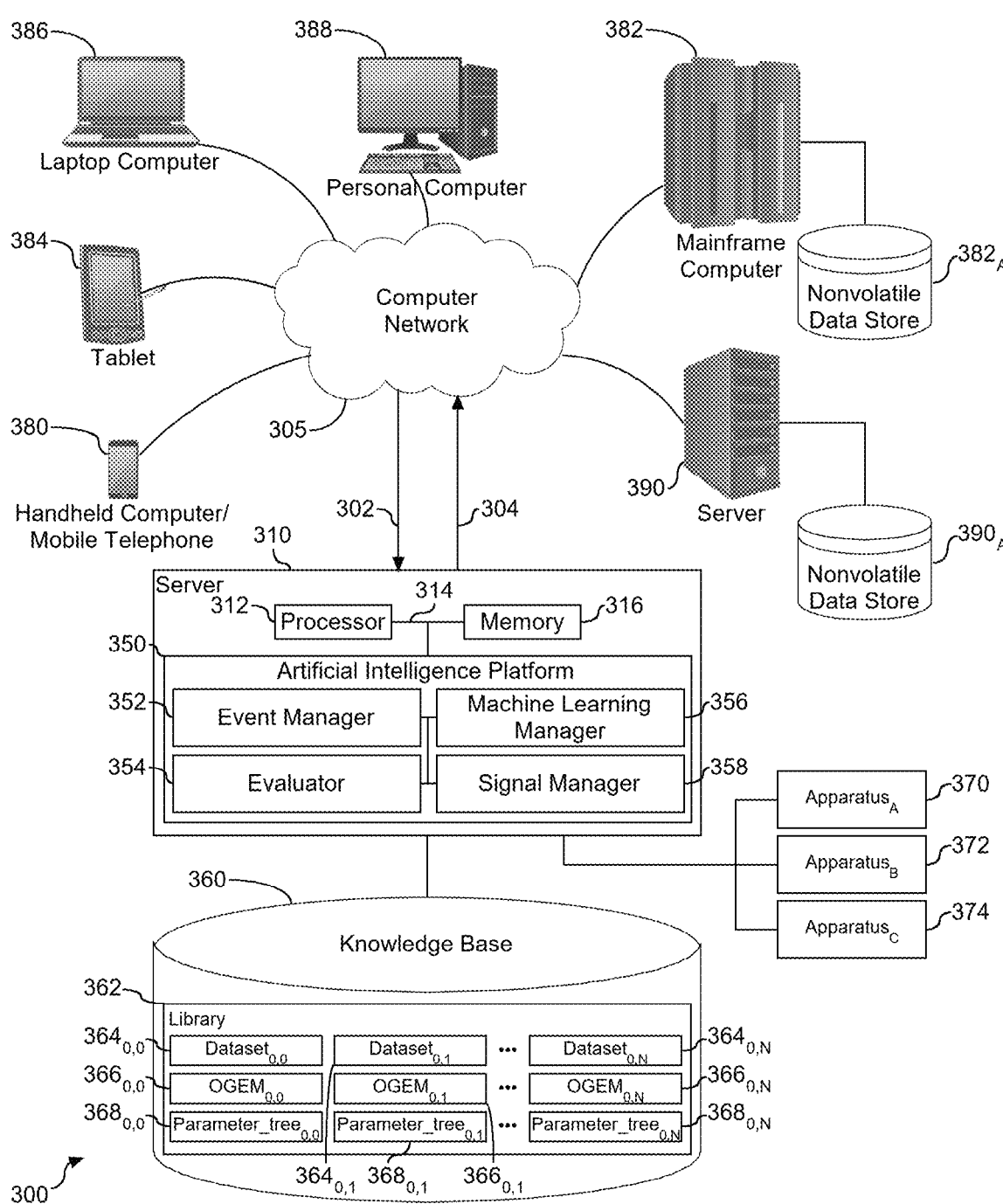
FIG. 3 illustrates a schematic diagram of a computer system to support and enable learning the tree representation of the OGEM graph, which in an exemplary embodiment is applied to a control action.

Referring to FIG. 3, a block diagram (300) is provided to illustrate a computer system with tools to support learning the tree representation of the OGEM, which in an exemplary embodiment is applied to a control action. The learning is directed at an event data stream, which in an embodiment represents time stamped, asynchronous, irregularly spaced event occurrences data on a time-line spanning multiple event types. The system and associated tools, as described herein, combine learning ordinal historical dependence of events and corresponding event types, and dynamically issuing a control signal to control or modify an event injection. As shown, a server (310) is provided in communication with a plurality of computing devices (380), (382), (384), (386), (388), and (390) across a network connection (305). The server (310) is configured with a processing unit (312), also referred to as a processor, operatively coupled to memory (314) across a bus (316). A tool in the form of an artificial intelligence (AI) platform (350) is shown local to the server (310), and operatively coupled to the processing unit (312) and memory (314). As shown, the AI platform (350) contains tools in the form of an event manager (352), an evaluator (354), a machine learning (ML) manager (356), and a signal manager (358). Together, the tools provide functional support for learning the tree representation of the OGEM for event data communicated or detected over the network from one or more of the computing devices (380), (382), (384), (386), (388), and (390), and for managing a corresponding event injection. The computing devices (380), (382), (384), (386), (388), and (390) communicate with each other and with other devices or components via one or more wires and/or wireless data communication links, where each communication link may comprise one or more of wires, routers, switches, transmitters, receivers, or the like. In this networked arrangement, the server (310) and the network connection (305) enables control over occurrence of one or more of the events associated with an event label through a corresponding generated control signal configured to control an operatively coupled apparatus and a corresponding event, which in an embodiment is identified via a corresponding event label, with the generated signal based on the learned parameter sharing environment. Other embodiments of the server (310) may be used with components, systems, sub-systems, and/or devices other than those that are depicted herein.

The tools, including the AI platform (350), or in one embodiment, the tools embedded therein including the event manager (352), the evaluator (354), the ML manager (356), and the signal manager (358) may be configured to receive input from various sources, including but not limited to input from the network (305), and an operatively coupled knowledge base (360). As shown herein, the knowledge base (360) includes a library (362) of temporal event datasets, shown herein as $dataset_{0,0}$ ($364_{0,0}$), $dataset_{0,1}$ ($364_{0,1}$), . . . , $dataset_{0,N}$ ($364_{0,N}$). The quantity of datasets in the library (362) is for illustrative purposes and should not be considered limiting. As shown herein by way of example, each of the temporal event datasets has a corresponding OGEM and parameter sharing architecture, also referred to herein as a parameter tree. Details of learning the OGEM(s) and parameter tree(s) are enabled by the ML manager (356), as described in detail below. As shown herein, $dataset_{0,0}$ ($364_{0,0}$) has corresponding $OGEM_{0,0}$ ($366_{0,0}$) and $parameter\_tree_{0,0}$ ($368_{0,0}$), $dataset_{0,1}$ ($364_{0,1}$) has corresponding $OGEM_{0,1}$ ($366_{0,1}$) and $parameter\_tree_{0,1}$ ($368_{0,1}$), and $dataset_{0,N}$ ($364_{0,N}$) has corresponding $OGEM_{0,N}$ ($366_{0,N}$) and $parameter\_tree_{0,N}$ ($368_{0,N}$). Similarly, in an exemplary embodiment, the knowledge base (360) may include one or more additional libraries each having one or more datasets therein. As such, the quantity of libraries shown and described herein should not be considered limiting.

The various computing devices (380), (382), (384), (386), (388), and (390) in communication with the network (305) demonstrate access points for the AI platform (350) and the corresponding tools, e.g. managers and evaluator, including the event manager (352), the evaluator (354), and the ML manager (356). As shown herein, the signal manager (358) is operatively coupled to the AI platform. In an embodiment, the signal manager (358) may be embedded as a tool within the AI platform. Some of the computing devices may include devices for use by the AI platform (350), and in one embodiment the tools (352), (354), (356), and (358) to support generating a parameter sharing architecture for events and event types, also referred to herein as a learned model, and dynamically generating a control signal directed at a physical apparatus operatively coupled to an event device to control event injection. The network (305) may include local network connections and remote connections in various embodiments, such that the AI platform (350) and the embedded tools (352), (354), (356), and (358) may operate in environments of any size, including local and global, e.g. the Internet. Accordingly, the server (310) and the AI platform (350) serve as a front-end system, with the knowledge base (360) and one or more of the libraries and datasets serving as the back-end system.

As described in detail below, the server (310) and the AI platform (350) leverage input from the knowledge base (360) in the form of temporal event data stored in datasets, e.g. $dataset_{0,1}$ ($364_{0,1}$) to jointly learn a corresponding OGEM and parameter tree, including learning all conditional intensity rate parameters. In an exemplary embodiment, temporal event dataset(s) may be transmitted across the network (305) from one or more of the operatively coupled machines or systems. The AI platform (350) utilizes the event manager (352) to receive temporal event data and to identify events and event occurrences therein. In an exemplary embodiment, a masking function, $\phi(\cdot)$, is leveraged by the event manager (352) to convert an event tuple sequence into a sub-sequence where no label is repeated. As shown in FIG. 1A, the example event stream is show with three event labels, e.g. $label_A$, $label_B$, and $label_C$. Although only three event types as identified by their labels are shown, in an exemplary embodiment, the event stream may include additional or alternative event labels. In an exemplary embodiment, the event types in the dataset are time-stamped, asynchronous, and irregularly spaced on the corresponding time-line. Accordingly, the event manager (352) models the event stream as a marked point process.

The dynamics of event occurrences are captured by conditional intensity functions, denoted herein by the variable $\lambda$, which measure the rate at which an event label occurs. In an exemplary embodiment, the conditional intensity for an event label can be written as a function of the history at that time. The evaluator (354), which is shown herein operatively coupled to the event manager (352), models the event stream, and more specifically learns the OGEM for the corresponding event stream. The OGEM captures ordinal historical dependence to represent different rates for different orders of a label's parent(s). The OGEM is a structure that shows historical influence of occurrences of a parent and arrival rate of a child. In an embodiment, the evaluator (354) stores the learned OGEM in the library of the knowledge base, and associates the learned OGEM with the corresponding dataset. Accordingly, the evaluator (354) interfaces with the event manager to learn the OGEM for the corresponding temporal event data, with the learned OGEM being a structure to illustrate influence of history of occurrence on rates of arrival of event types.

As shown and described in FIG. 2, a tree OGEM, also referred to herein as a parameter sharing architecture, is learned from the OGEM learned by the evaluator (354). The ML manager (356), which is shown herein operatively coupled to the evaluator (354), is configured to learn the tree OGEM. More specifically, the ML manager (356) leverages the learned OGEM, shown by way of example in FIG. 1B, to learn the tree OGEM, shown by way of example in FIG. 2. The ML manager (356) learns order dependent statistical and causal co-occurrence relationships among the event types in the temporal event data. In an exemplary embodiment, the ML manager (356) assigns each leaf in the tree a label from an event label set. In an embodiment, the assigned event label set may be restricted by a subset of labels or a wildcard to accept any label in the event label set. Thus, the leaves of the tree represent an order sensitive parameterization for events of the OGEM. As shown and described above in the pseudocode labeled as Algorithm 1, the corresponding algorithm leveraged by the ML manager (356) illustrates a greedy approach for growing subtrees, and therefore determining parameters at the leaves.

The signal manager (358) is shown herein operatively coupled to the ML manager (356). In an embodiment, the signal manager (358) is operatively coupled to the AI platform (350). The signal manager (358) leverages the tree architecture to track the history of event occurrences in real-time. It is understood in the art, that a child event is dependent on a parent event, and in an exemplary embodiment more than one parent event. As such, in an exemplary embodiment, the occurrence of a child event may be modified in some form by controlling an event of the parent. In an embodiment, an event occurs or is issued by a corresponding physical apparatus. As shown by way of example, $apparatus_A$ (370) is associated with event label A, $apparatus_B$ (372) is associated with event label B, and $apparatus_C$ (374) is associated with event label C. The signal manager (358) is configured to selectively generate or issue a control signal to one or more of the apparatus to control an event injection. Referring to FIG. 1B, the signal manager (358) may issue a control signal to $apparatus_A$ (370) to modify, delay, or otherwise mitigate the effects of event label A on event label C. For example, $apparatus_A$ (370) may be a product dispenser and $apparatus_B$ (372) may be a packaging apparatus for the dispensed product, and the issued signal may modify a product dispensing rate to accommodate the rate at which the packaging apparatus receives the dispensed product. In an embodiment, the signal manager (358) computes a control action for a corresponding predictive event type, and selectively generates the control signal based on the computed control action. The control action may be applied as a feedback signal to directly control the event injection to maximize a likelihood of realizing an event, which in one embodiment may be an event that cannot be directly controlled. Accordingly, the signal manager (358) leverages the learned tree architecture to selectively issue a control signal, or in an embodiment a feedback signal, to one or more physical devices that are the subject of the tree architecture in order to control injection of an event into the temporal event data.

Although shown as being embodied in or integrated with the server (310), the AI platform (350) may be implemented in a separate computing system (e.g., 390) that is connected across the network (305) to the server (310). Similarly, although shown local to the server (310), the tools (352), (354), (356), and (358) may be collectively or individually distributed across the network (305). Wherever embodied, the event manager (352), the evaluator (354), the ML manager (356), and the signal manager (358) are utilized to support and enable modeling ordinal historical depending in event streams with tree representations, and leveraging the tree representations in real-time to control an event injection.

Types of information handling systems that can utilize server (310) range from small handheld devices, such as a handheld computer/mobile telephone (380) to large mainframe systems, such as a mainframe computer (382). Examples of a handheld computer (380) include personal digital assistants (PDAs), personal entertainment devices, such as MP4 players, portable televisions, and compact disc players. Other examples of information handling systems include a pen or tablet computer (384), a laptop or notebook computer (386), a personal computer system (388) and a server (390). As shown, the various information handling systems can be networked together using computer network (305). Types of computer network (305) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (390) utilizes nonvolatile data store (390$_A$), and mainframe computer (382) utilizes nonvolatile data store (382$_A$). The nonvolatile data store (382$_A$) can be a component that is external to the various information handling systems or can be internal to one of the information handling systems.

Information handling systems may take many forms, some of which are shown in FIG. 3. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 4:
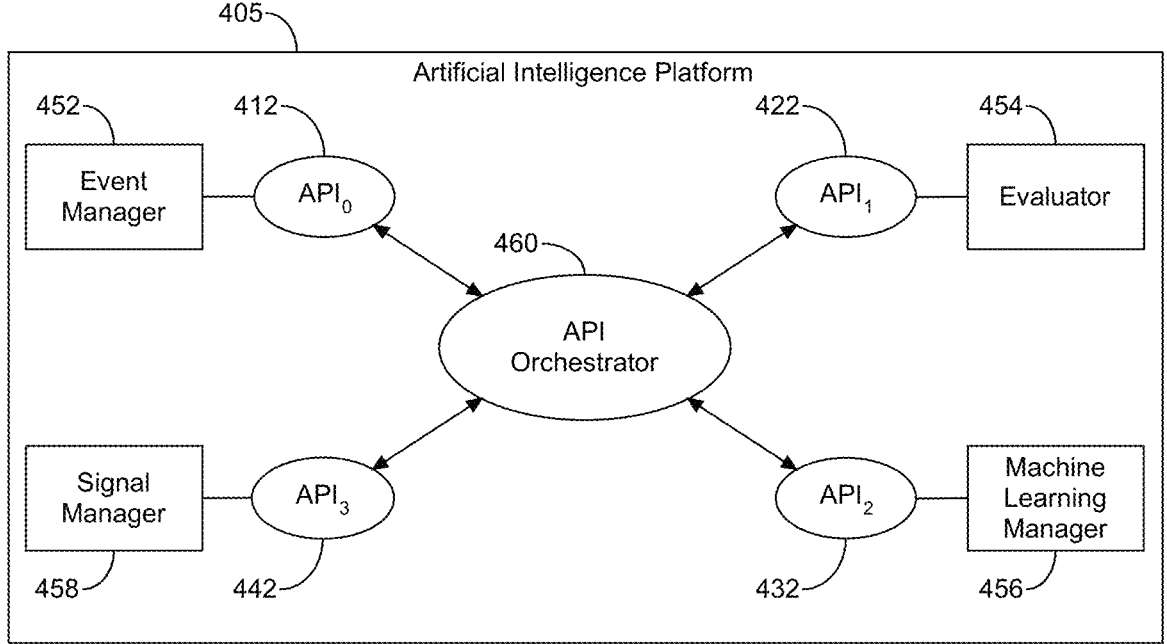
FIG. 4 illustrates a block diagram depicting the AI platform tools, as shown and described in FIG. 3, and their associated application program interfaces (APIs).

An Application Program Interface (API) is understood in the art as a software intermediary between two or more applications. With respect to the embodiments shown and described in FIG. 3, one or more APIs may be utilized to support one or more of the AI platform tools, including the event manager (352), the evaluator (354), the ML manager (356), and the signal manager (358), and their associated functionality. Referring to FIG. 4, a block diagram (400) is provided illustrating the AI platform tools and their associated APIs. As shown, a plurality of tools are embedded within the AI platform (405), with the tools including the event manager (452) associated with API$_0$ (412), the evaluator (454) associated with API$_1$ (422), the ML manager (456) associated with API$_2$ (432), and the signal manager (458) associated with API$_3$ (442). Each of the APIs may be implemented in one or more languages and interface specifications.

API$_0$ (412) provides support for modeling the event stream as a marked point process. API$_1$ (422) provides support for modeling the event stream and learning the OGEM for the corresponding event stream. API$_2$ (432) provides support for learning the tree OGEM. API$_3$ (442) provides support for leveraging the learned tree architecture to selectively issue a control signal, or in an embodiment a feedback signal, to one or more physical devices that are the subject of the tree architecture.

As shown, each of the APIs (412), (422), (432), and (442) are operatively coupled to an API orchestrator (460), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Referring to FIG. 5, a flow chart (500) is provided to illustrate a process for learning the OGEM tree and leveraging the learn OGEM tree to selectively control an event injection. As an initial step, temporal event data is received (502). The temporal event data may be received from a locally coupled device, or across a network connection, e.g. (305). An example of received temporal event data is shown in FIG. 1A, with three events shown and described and referenced by corresponding event labels, e.g. label$_A$, label$_B$, and label$_C$. Each of the events is shown by way of example as occurring more than one time in the temporal event data provided. The temporal event data is subject to modeling of temporal relationships between one or more events in the temporal event data (504). An ordered graphical event model (OGEM) is learned for the corresponding event stream and the modeling of the temporal relationships (506). The OGEM captures ordinal historical dependence of events captured in the temporal event data. In an exemplary embodiment, the OGEM is a structure that illustrates influence of history of occurrences on rates of arrival of event types. Accordingly, the initial aspect is directed at learning the OGEM for the received temporal event data.

Following step (506), the OGEM is leveraged to automatically learn a parameter sharing architecture, referred to herein as a tree structure (508). Learning the tree structure includes learning order dependent statistical and causal co-occurrence relationships among the event types. The tree structure is a tree based ordinal graphical event model, with each leaf in the tree assigned a label from the event label set represented in the temporal event data. In an embodiment, the assigned label may be restricted by a subset of the label or a wildcard to accept any label in the event label set. Details of the learning aspects and associated computations are shown and described above in the pseudo-code shown in Algorithms 1, 2, and 3, as supported by the computations in Equations 1 and 2 of maximizing the log-likelihood of the data, see Equation 1, with a score-based penalty, see Equation 2. The learned tree structure is leveraged in real time, e.g. dynamically, to track the history of event occurrences in real-time (510). As shown and described in FIG. 3, a signal manager (358) functions to selectively issue a control signal to an operatively coupled event device to control an event injection. Following step (510), an assessment is conducted to determine if issuance of the control signal is warranted for one or more of the operatively coupled event devices in order to inject an event into the corresponding apparatus (512). A positive response to the assessment is followed by identification of the device that is the subject of the event injection, generation and configuration of the signal, and transmission of the signal to the identified device (514). In an embodiment, at step (514) the signal manager (358) computes a control action for a corresponding predictive event type. In an embodiment, the signal may modify the device for a single occasion, or in an exemplary embodiment, the signal may modify the device for multiple occasions. Following step (514) or a negative response to the assessment, the process returns to step (510) for continued dynamic tracking of event occurrences. Accordingly, as shown and described herein, order-dependent statistical and causal co-occurrence relationships among multiple event types are learned using a parameter sharing environment, which is leveraged to selectively issue a signal to control an event injection to one or more operatively coupled devices.

Certain exemplary embodiments of the systems, methods, and computer program products described herein produce a tree based parameter sharing architecture reflecting temporal event data collections of cause-effect pairs in an automated, substantially or entirely unsupervised manner. Exemplary embodiments further involve the use learned of the architecture in real-time for injecting control signal to an operatively coupled device to inject an event, and thereby maximize a likelihood of realizing an event, which in an embodiment cannot be directly controlled.

Aspects of the functional tools (352), (354), (356), and (358) and their associated functionality may be embodied in a computer system/server in a single location, or in an embodiment, may be configured in a cloud-based system sharing computing resources. With references to FIG. 6, a block diagram (600) is provided illustrating an example of a computer system/server (602), hereinafter referred to as a host (602) in communication with a cloud-based support system, to implement the processes described above with respect to FIG. 1A-5. The host (602) is operational with numerous other general purpose or special purpose computing system environments or configurations. Examples of well-known computing systems, environments, and/or configurations that may be suitable for use with the host (602) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments (610) where tasks are performed by remote processing devices that are linked through a communications network. In a distributed cloud computing environment, program modules may be located in both local and remote computer system storage media including memory storage devices.

Figure 6:
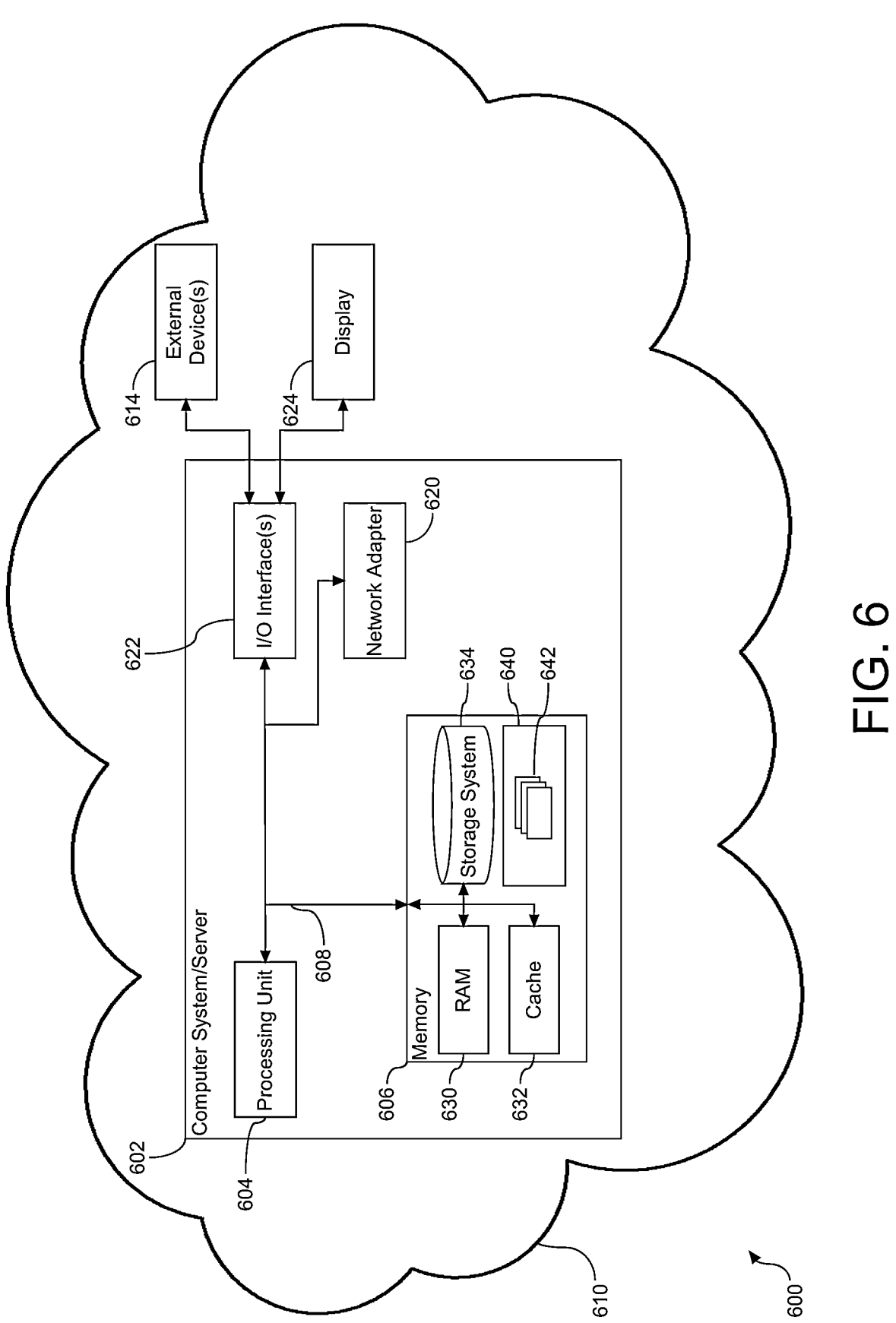
FIG. 6 illustrates a block diagram depicting an example of a computer system/server of a cloud based support system, to implement the system and processes described above with respect to FIGS. 1-5.

As shown in FIG. 6, the host (602) is shown in the form of a general-purpose computing device. The components of the host (602) may include, but are not limited to, one or more processors or processing units (604), e.g. hardware processors, a system memory (606), and a bus (608) that couples various system components including the system memory (606) to the processing unit (604). A bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The host (602) typically includes a variety of computer system readable media. Such media may be any available media that is accessible by the host (602) and it includes both volatile and non-volatile media, removable and non-removable media.

The system memory (606) can include computer system readable media in the form of volatile memory, such as random access memory (RAM) (630) and/or cache memory (632). By way of example only, a storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus (608) by one or more data media interfaces.

A program/utility (640), having a set (at least one) of program modules (642), may be stored in the system memory (606) by way of example, and not limitation, as well as an operating system, one or more application programs, other program modules, and program data. Each of the operating systems, one or more application programs, other program modules, and program data or some combination thereof, may include an implementation of a networking environment. The program modules (642) generally carry out the functions and/or methodologies of embodiments to support and enable learning the tree based architecture for the ordinal graphical event model. For example, the set of the program modules (642) may include the tools (352), (354), (356), and/or (358) as described in FIG. 3.

The host (602) may also communicate with one or more external devices (614), such as a keyboard, a pointing device, etc.; a display (624); one or more devices that enable a user to interact with the host (602); and/or any devices (e.g., network card, modem, etc.) that enable the host (602) to communicate with one or more other computing devices. Such communication can occur via Input/Output (I/O) interface(s) (622). Still yet, the host (602) can communicate with one or more networks such as a local area network (LAN), a general wide area network (WAN), and/or a public network (e.g., the Internet) via a network adapter (620). As depicted, the network adapter (620) communicates with the other components of the host (602) via the bus (608). In an embodiment, a plurality of nodes of a distributed file system (not shown) is in communication with the host (602) via the I/O interface (622) or via the network adapter (620). It should be understood that although not shown, other hardware and/or software components could be used in conjunction with the host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as the system memory (606), including the RAM (630), the cache (632), and the storage system (634), such as a removable storage drive and a hard disk installed in a hard disk drive.

Computer programs (also called computer control logic) are stored in the system memory (606). Computer programs may also be received via a communication interface, such as the network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

In an embodiment, the host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
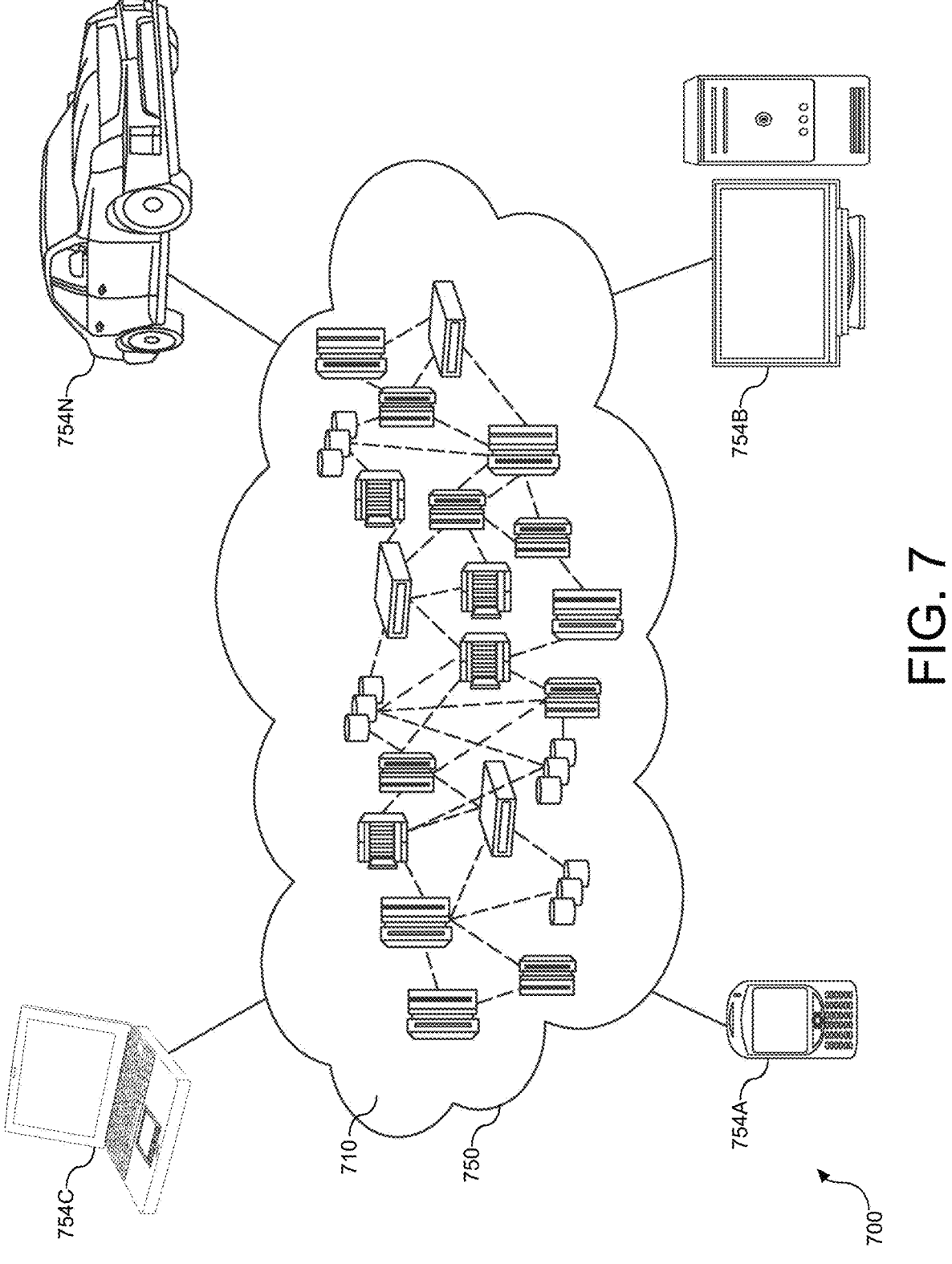
FIG. 7 illustrates a block diagram depicting a cloud computer environment.

Referring now to FIG. 7, an illustrative cloud computing network (700) is shown. The cloud computing network (700) includes a cloud computing environment (750) having one or more cloud computing nodes (710) with which local computing devices used by cloud consumers may communicate. Examples of these local computing devices include, but are not limited to, a personal digital assistant (PDA) or a cellular telephone (754A), a desktop computer (754B), a laptop computer (754C), and/or automobile computer system (754N). Individual nodes within the cloud computing nodes (710) may further communicate with one another. They may be grouped (not shown) physically or virtually, in one or more networks, such as Private, Community, Public, or Hybrid clouds as described hereinabove, or a combination thereof. This allows the cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
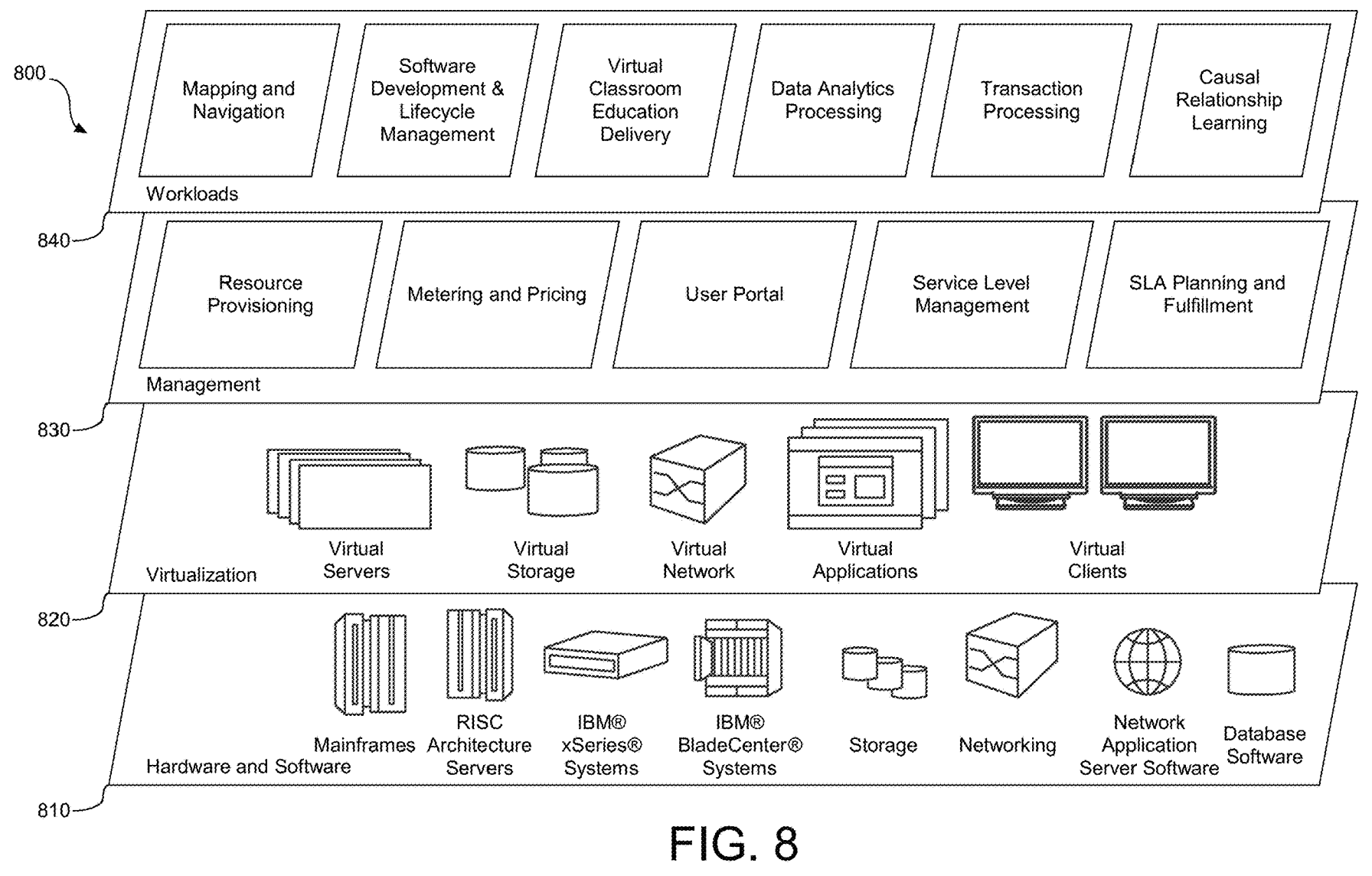

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: a hardware and software layer (810), a virtualization layer (820), a management layer (830), and a workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer (820) provides an abstraction layer from which the following examples of virtual entities may be provided: virtual servers; virtual storage; virtual networks, including virtual private networks; virtual applications and operating systems; and virtual clients.

In one example, the management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

The workloads layer (840) provides examples of functionality for which the cloud computing environment may be utilized. Examples of workloads and functions which may be provided from this layer include, but are not limited to: mapping and navigation; software development and life-cycle management; virtual classroom education delivery; data analytics processing; transaction processing; and causal relationship learning.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles. As used herein, the term "and/or" means either or both (or any combination or all of the terms or expressed referred to), e.g., "A, B, and/or C" encompasses A alone, B alone, C alone, A and B, A and C, B and C, and A, B, and C.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to provide improvements to identifying and verifying causal pairs.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Additional blocks not represented in the Figures may be included, for example, prior to, subsequent to, or concurrently with one or more illustrated blocks. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, capturing ordinal historical dependencies, learning the corresponding tree architecture, and leveraging the architecture for selective signal computation and generation may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer system comprising:

a processor; and a memory in communication with the processor, the memory containing program instructions that, when executed by the processor, are configured to cause the processor to perform a method of learning a tree ordinal graphical event model from temporal event data comprising a time-stamped event stream, the method comprising:

modeling temporal relationships between one or more events in the temporal event data, wherein each event is represented by a node;

learning an ordered graphical event model (OGEM) graph, including capturing ordinal historical dependence of the one or more events for a time window prior to each occurrence of the event, wherein the OGEM graph is a structure configured to illustrate influence of history of occurrences on rates of arrival of event types;

automatically learning a parameter sharing architecture, including leveraging the OGEM graph and learning order dependent statistical and causal co-occurrence relationships among event types;

computing, based on a tracked history of event occurrences in real time, a control action for a corresponding predictive event type;

generating, selectively, a control signal based on the computed control action;

applying the generated control signal as a feedback signal to selectively control a corresponding event injection; and dynamically issuing the control signal to an operatively coupled event device associated with at least one event type reflected in the learned parameter sharing architecture, wherein the control signal is configured to selectively control the event injection in accordance with the captured ordinal historical dependence, and wherein the event injection is configured to manage event behavior within the temporal event data, wherein the learned parameter sharing architecture is configured to capture event dynamics by one or more conditional intensity functions to measure a rate of occurrence of an event label.

2. The computer system of claim 1, wherein the learned parameter sharing architecture is a tree based OGEM, and further comprises assigning each leaf in the tree with a label from an event label set, wherein the event label set is restricted by a subset of labels or a wildcard to accept any label in the event label set, and wherein the leaves of the tree represent an order sensitive parameterization for events of the OGEM.

3. The computer system of claim 1, wherein managing the event behavior comprises an action selected from the group consisting of modifying, delaying, or mitigating effects of one event on another event.

4. The computer system of claim 1, wherein the temporal event data comprises asynchronous time-stamped events with irregular inter-event spacing.

5. The computer system of claim 1, wherein learning the parameter sharing architecture includes applying a masking function to derive an active order of event types.

6. A computer program product comprising:

a computer readable storage device; and program code embodied with the computer readable storage device, the program code executable by a processor to:

model temporal relationships between one or more events in received temporal event data, wherein each event is represented by a node;

learn an ordered graphical event model (OGEM) graph, including capture ordinal historical dependence of the one or more events for a time window prior to each occurrence of the event, wherein the OGEM graph is a structure configured to illustrate influence of history of occurrences on rates of arrival of event types;

automatically learn a parameter sharing architecture, including leverage the OGEM graph and learning order dependent statistical and causal co-occurrence relationships among event types;

compute, based on a tracked history of event occurrences in real time, a control action for a corresponding predictive event type;

generate, selectively, a control signal based on the computed control action;

apply the generated control signal as a feedback signal to selectively control a corresponding event injection;

dynamically issue the control signal to an operatively coupled event device associated with at least one event type reflected in the learned parameter sharing architecture, wherein the control signal configured to selectively control the event injection in accordance with the captured ordinal historical dependence, and wherein the event injection is configured to manage event behavior within the temporal event data, wherein the learned parameter sharing architecture is configured to capture event dynamics by one or more conditional intensity functions to measure a rate of occurrence of an event label.

7. The computer program product of claim 6, wherein the learned parameter sharing architecture is a tree based OGEM, and further comprising program code configured to assign each leaf in the tree with a label from an event label set, wherein the event label set is restricted by a subset of labels or a wildcard to accept any label in the event label set, and wherein the leaves of the tree represent an order sensitive parameterization for events of the OGEM.

8. A method comprising:

modeling temporal relationships between one or more events in received temporal event data, wherein each event is represented by a node;

learning an ordered graphical event model (OGEM) graph, including capturing ordinal historical dependence of the one or more events for a time window prior to each occurrence of the event, wherein the OGEM graph is a structure configured to illustrate influence of history of occurrences on rates of arrival of event types;

automatically learning a parameter sharing architecture, including leveraging the OGEM graph and learning order dependent statistical and causal co-occurrence relationships among event types;

computing, based on a tracked history of event occurrences in real time, a control action for a corresponding predictive event type;

generating, selectively, a control signal based on the computed control action;

applying the generated control signal as a feedback signal to selectively control a corresponding event injection;

dynamically issuing the control signal to an operatively coupled event device associated with at least one event type reflected in the learned parameter sharing architecture, and based on the history of occurrence rates, wherein the control signal configured to selectively control the event injection in accordance with the captured ordinal historical dependence, and wherein the event injection is configured to manage event behavior within the temporal event data, wherein the learned parameter sharing architecture is configured to capture event dynamics by one or more conditional intensity functions for measuring a rate of occurrence of an event label.

9. The method of claim 8, wherein the learned parameter sharing architecture is a tree based OGEM, and further comprising assigning each leaf in the tree with a label from an event label set, wherein the event label set is restricted by a subset of labels or a wildcard to accept any label in the event label set, and wherein the leaves of the tree represent an order sensitive parameterization for events of the OGEM.

10. The method of claim 8, wherein managing the event behavior comprises an action selected from the group consisting of modifying, delaying, or mitigating effects of one event on another event.

11. The method of claim 8, wherein the temporal event data comprises asynchronous time-stamped events with irregular inter-event spacing.

12. The method of claim 8, wherein learning the parameter sharing architecture includes applying a masking function to derive an active order of event types.

* * * * *